(No Model.) 6 Sheets—Sheet 1.
J. A. OSTENBERG.
AUTOMATIC WEIGHING AND PACKING MACHINE.

No. 492,485. Patented Feb. 28, 1893.

Fig. 1.

(No Model.) 6 Sheets—Sheet 4.

J. A. OSTENBERG.
AUTOMATIC WEIGHING AND PACKING MACHINE.

No. 492,485. Patented Feb. 28, 1893.

Witnesses: W. J. Sankey, J. Ralph Orwig.
Inventor: John A. Ostenberg,
By Thomas G. Orwig, Attorney.

(No Model.) 6 Sheets—Sheet 5.
J. A. OSTENBERG.
AUTOMATIC WEIGHING AND PACKING MACHINE.
No. 492,485. Patented Feb. 28, 1893.

(No Model.) 6 Sheets—Sheet 6.

J. A. OSTENBERG.
AUTOMATIC WEIGHING AND PACKING MACHINE.

No. 492,485. Patented Feb. 28, 1893.

Witnesses:
W. J. Sankey.
J. Ralph Orwig.

Inventor: John A. Ostenberg,
By Thomas C. Orwig, Attorney.

UNITED STATES PATENT OFFICE.

JOHN A. OSTENBERG, OF DES MOINES, IOWA, ASSIGNOR TO F. M. GILBERT, OF WALPOLE, NEW HAMPSHIRE.

AUTOMATIC WEIGHING AND PACKING MACHINE.

SPECIFICATION forming part of Letters Patent No. 492,485, dated February 28, 1893.

Application filed June 25, 1892. Serial No. 438,036. (No model.)

*To all whom it may concern:*

Be it known that I, JOHN A. OSTENBERG, a citizen of the United States of America, residing at Des Moines, in the county of Polk and State of Iowa, have invented a new and useful Automatic Weighing and Packing Machine, of which the following is a specification.

My object is broadly to provide an improved machine adapted to automatically and accurately weigh any predetermined amount of loose material such as starch, grain, spices &c. and to discharge the weighed substances in packages.

A further object is to provide a strong and durable supporting frame for the operating mechanism with a containing hopper at its top and a main vibrating discharge spout and an auxiliary vibrating discharge spout leading from the hopper.

A further object is to provide an auxiliary dumping scoop adapted to receive the discharge from the main discharge spout and be automatically dumped into the main weighing and dumping receptacle when the latter is dumped and to remain in such a position until the receptacle contains sufficient weight to cause it to overbalance the main weighing beam.

A further object is to provide a main weighing and dumping receptacle pivoted below its central portion and adapted to be dumped on either side and having a central portion dividing it longitudinally into two compartments either of which may be brought into position to receive substances from the auxiliary dumping scoop and also from the auxiliary discharge scoop and which is mounted upon a weighing beam in such a manner as to be automatically dumped into a discharge spout after the contents of the auxiliary scoop together with what is added by the auxiliary discharge spout have been deposited therein.

My object is further to provide simple, strong and durable mechanism for imparting a vibratory motion to the discharge spouts.

My object is further to provide mechanism connected with the auxiliary dumping scoop and the main weighing and dumping receptacle in such a manner that the auxiliary dumping scoop will normally discharge into the main weighing and dumping receptacle until the latter contains a certain predetermined quantity when it will overbalance certain weights with which it is connected and thereby be lowered which operation will cause the said mechanism to automatically stop the discharge from the auxiliary dumping scoop and the addition of a small amount of the discharge from the auxiliary discharge spout will overbalance certain other weights and lower it still further, which movement will actuate mechanism, which in turn, will dump the main weighing and dumping receptacle.

My object is further to provide simple, durable and easily operated means for adjusting the incline of the vibrating discharge spouts to regulate the flow therefrom.

Another object is to provide convenient means for throwing the operative mechanism of the machine in and out of gear which means shall be simple and durable in construction and direct and positive in action.

Another object of my invention is to provide an improved means for adjusting the poise on the scale bar.

My invention has certain other objects which are of minor importance and which will be mentioned hereinafter together with the description of the parts to which they appertain.

My invention consists, first, in the construction of a frame having a hopper at its top and so arranged as to contain and support the operative mechanism of the machine.

My invention consists further in the construction and arrangement of the pipes leading from the hopper to the vibrating discharge spouts in communication with said pipes, and the means for adjusting the incline of the discharge spouts and the means for regulating the flow into the discharge spouts.

My invention consists further in the construction, arrangement and combination of an auxiliary dumping scoop adapted to receive from the main vibrating discharge spout a major portion of the substance to be weighed, and to automatically assume a position which will direct the discharge into the main weighing and dumping receptacle and which will automatically assume a position in which it contains the discharge when an amount approximating but not quite equaling in weight the predetermined capacity of the said main weighing and dumping receptacle.

My invention consists further in certain details in the construction and combination of the mechanism for operating the said auxiliary discharge scoop.

My invention consists further in the construction of a weighing and dumping receptacle having two compartments and adapted to dump alternately in two directions and in the construction and arrangement of the duplex weighing beams upon which the said receptacle is mounted so that it may be slightly lowered when a part of the requisite amount of weight has been deposited therein to thereby set in motion certain mechanism, and be lowered still further when all of the predetermined capacity of said receptacle is deposited therein to thereby set in motion mechanism for actuating the tripping mechanism which in turn dumps the receptacle.

My invention consists further in the construction of the mechanism used to impart a vibratory motion to the discharge spouts.

My invention consists further in the construction and arrangement of the tripping mechanism whereby the weighing and dumping receptacle is automatically dumped.

My invention consists further in the construction of a poise and its manner of adjustment on the scale bar.

My invention consists further in the construction and arrangement of the means for throwing the operative mechanism of the machine in and out of gear.

My invention consists further in certain minor details of construction, arrangement and combination of the various parts of the machine as hereinafter set forth pointed out in my claims and illustrated in the accompanying drawings in which—

Referring to the accompanying drawings the reference symbol 10 is used to designate the base of the machine which is preferably cast complete in one piece, and of the form shown.

11 designates the support and containing frame work of the machine. This latter has a bar extending through it with bearing boxes 12 at its ends and an enlarged portion 13 in its central portion. Its upper end is adapted in shape to support the hopper 14 into which the substance to be weighed is first deposited. Extended through the aforesaid enlarged portion in the frame 11 and having its bearing in said bearing boxes 12 is a rotatable shaft 15 having fixed to its ends the belt wheel 16 and the balance wheels 17, 17 one of which latter is preferably provided with an annular groove 18 in its periphery adapting it to be operated by a rope or round belt, and to the remaining wheel 17 is fixed a handle 19 whereby it may be manually operated.

Leading from the hopper 14 are two discharge pipes 20 and 21 the latter being of much larger capacity than the former.

22 and 23 designate standards projecting upwardly from the enlarged portion 13 of the frame 11, and extending upwardly through these standards are the shafts 24 and 25 which have their bearings therein and rest upon the base of the interior of the enlarged portion 13. Fixed to the upper end of each of the said shafts are the forks 26 and 27 and pivoted to the ends thereof are the discharge spouts 28 and 29 which are located directly below the discharge pipes 20 and 21 respectively, in such a manner as to communicate therewith.

The guides or aprons 30 and 31, serve to regulate the flow from the hopper to the discharge spouts by adjusting the size of the opening between the bottom of the discharge spout and the lower edges of the guides or aprons. These guides or aprons are constructed of sheet metal and are shaped in such a manner that their central portions may partially enter the discharge spouts and their ends meet in the rear of the discharge pipes leading from the containing hopper. One end of each of the guides or aprons is bifurcated and the remaining end thereof has a projection adapted to enter said bifurcated end.

32 designates a wire rod having a crank arm formed in its approximate central portion and an operating handle formed on its top portion, the bifurcated end of said apron is pivotally attached to said rod 32 above and below its crank arm formed thereon and the said projection on the remaining end of the guide or apron is pivotally attached to said crank arms formed in the rod 32.

To adjust the guide or apron 30, relative to the discharge spout leading from the hopper, the handle or top of the rod 32 is turned in such a manner that the crank arm formed on the said rod will be placed in a position in which it is removed from the bifurcated end of the guide or apron 30 to its farthest possible limit, this it will be obvious will loosen the guide or apron, so that it may be adjusted upon the discharge pipe, and to tighten the guide or apron on said pipe the portion of the guide or apron which is attached to the crank arm of the rod is made to overlap the bifurcated end of said guide or apron by a manipulation of the handle at the top of the rod 32.

Means are also provided for adjusting the incline of the discharge spouts 28 and 29 as required to regulate the flow therefrom as follows:—33 designates a set screw extended longitudinally of the spout through a lug 34 which latter is screw threaded to admit said screw to be turned therein and is formed on or fixed to the top of the shaft 24. 35 is an angular piece of metal secured to the spout and extending downwardly therefrom. The end of the set screw 33 is adapted to engage this angular piece 35 and by being turned change the inclination of the spout.

The following means are provided for imparting a vibratory movement to the aforesaid discharge spouts as required to produce a uniform flow therefrom. The reference symbol 36 designates a wave wheel fixed to the shaft 15 inside of the enlarged portion 13. 37 is an arm fixed to the shaft 34 and extended inwardly toward the wave wheel 36 and approximately parallel with the shaft 15. 38 is a coil spring encircling the shaft 24 and normally tending to hold the arm 37 rearwardly. 39 is an arm fixed to the shaft 25 and extending inwardly toward the wave wheel 36 and in the rear of the arm 37. 40 designates a coil spring secured to the free end of the arm 39 and normally tending to draw it forwardly so as to bring the arm 37 into engagement with the wave wheel 36. It will now readily be seen that upon the rotation of the wave wheel 36 the arms 37 and 39 will follow the contour of the wave wheel, and by reason of their being fixed to the shafts 24 and 25 will impart a vibratory movement to the discharge spouts at their tops. 41 designates a lever fulcrumed to the frame 11 and having its upper end extended into the interior of the enlarged portion 13 where the spring 40 is attached thereto. This lever is normally retained in position with its upper end inclined forwardly to stretch the spring 40 but may be moved so as to release the tension of the spring 40 and thereby permit the coil spring 38 to throw the arms 37 and 39 rearwardly and out of engagement with the wave wheel 36.

Figure 1:
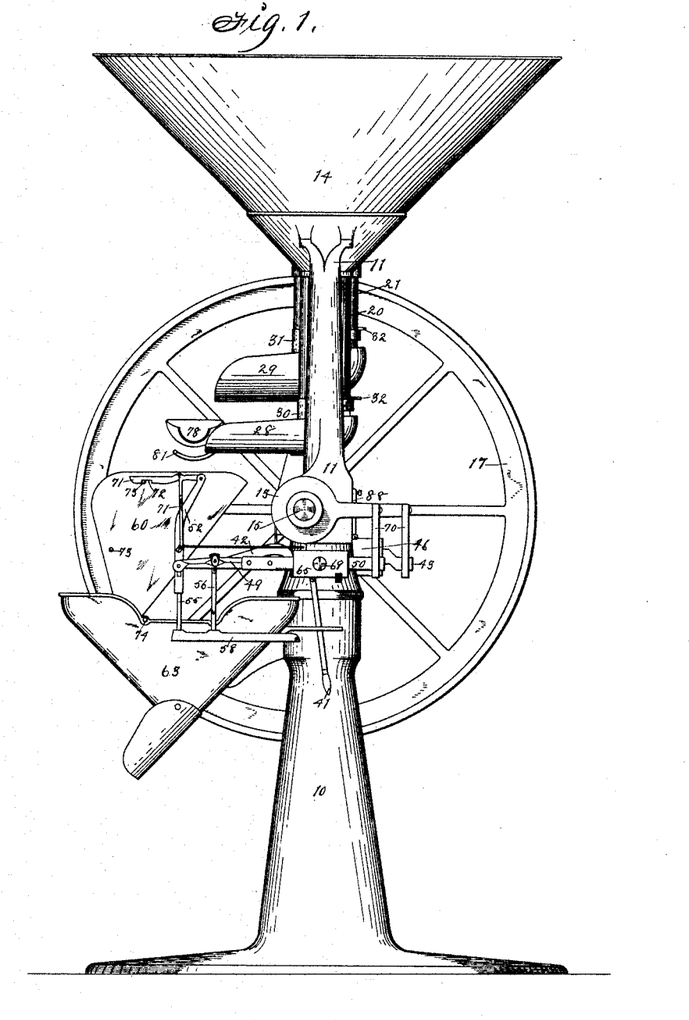
Figure 1 is a side elevation of the complete machine, save that one of the balance wheels is removed to reveal the operative mechanism.
Figure 2:
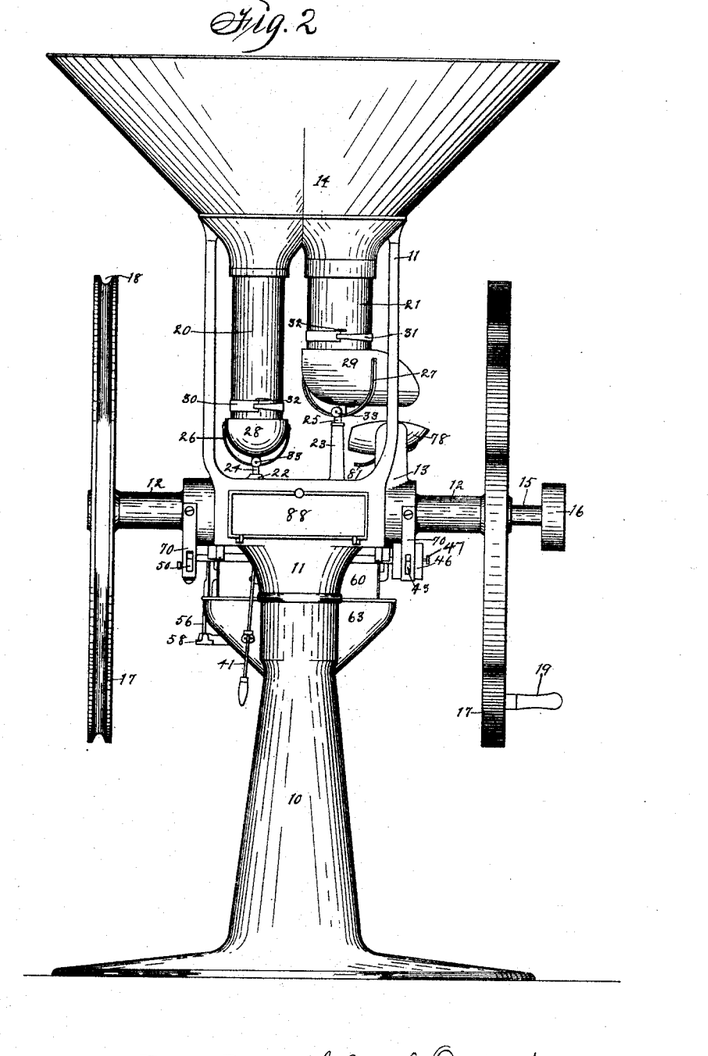
Fig. 2 is a rear elevation of the complete machine.
Figure 3:
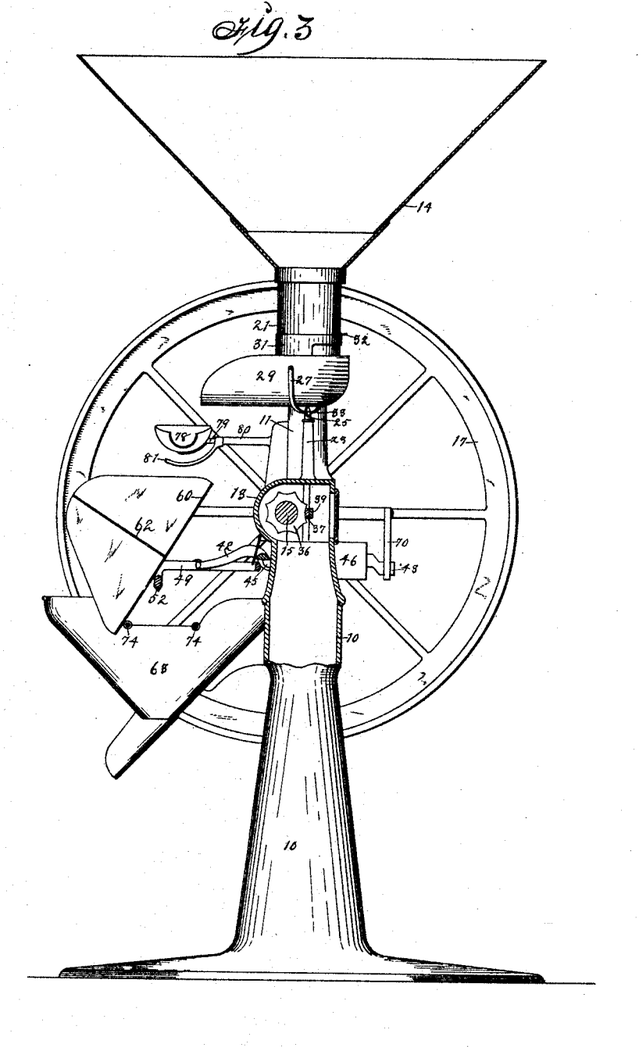
Fig. 3 is a vertical sectional view of the complete machine.
Figure 4:
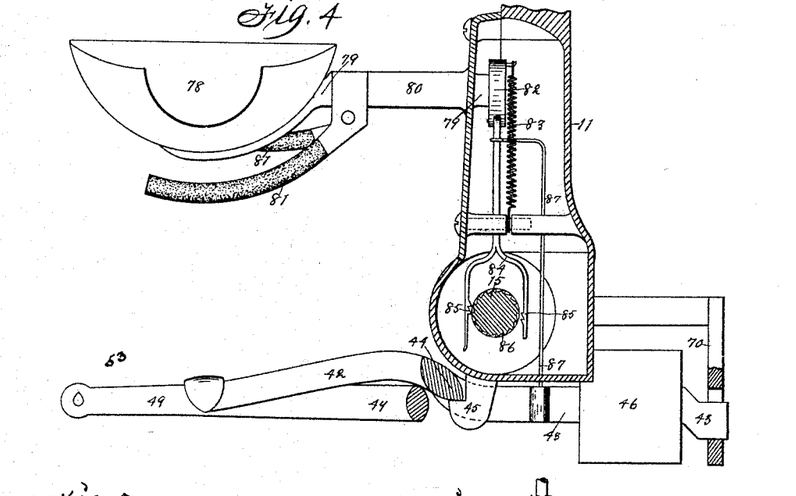
Fig. 4 is an enlarged detail side view of the auxiliary dumping scoop, the means for operating the same and also showing parts of the weighing beams and their connection with the main supporting frame.
Figures 5, 6, 7:
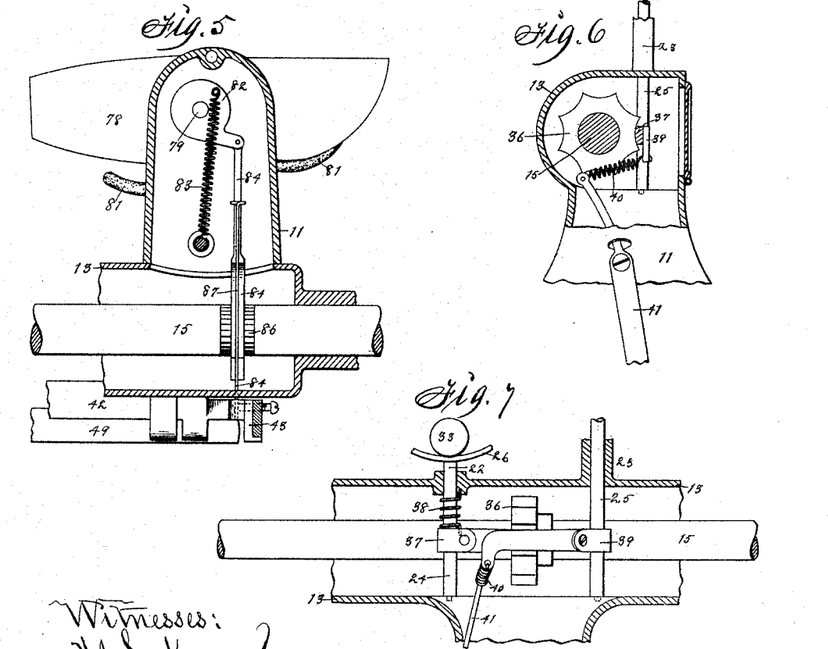
Fig. 5 is an enlarged detail rear view showing substantially the same mechanism illustrated in Fig. 4.
Fig. 6 is an enlarged detail side view showing part of the mechanism for imparting a vibratory movement to the discharge spouts, and the means for throwing said mechanism in and out of gear.
Fig. 7 is an enlarged detail rear view showing the mechanism for imparting a vibratory movement to the discharge spouts and also showing part of the mechanism for throwing the operative mechanism in and out of gear.
Figure 8:
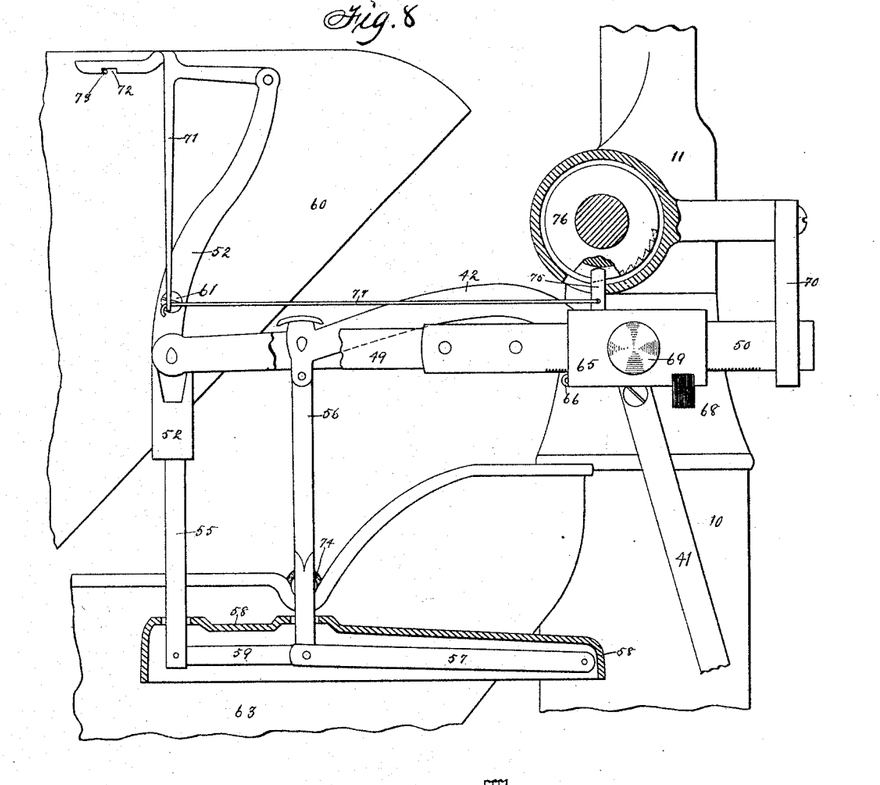
Fig. 8 is an enlarged detail side view of part of the weighing beams, the scale bar and adjustable poise part of the weighing and dumping receptacle, the tripping mechanism, and part of the supporting frame.
Figures 9, 10, 11:
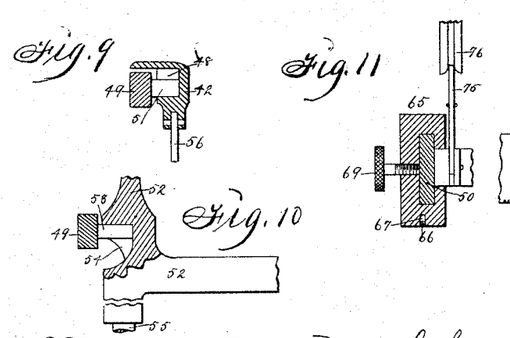
Fig. 9 is an enlarged detail transverse sectional view showing the pivotal connection between the main weighing beam and the supplementary weighing beam.
Fig. 10 is an enlarged, detail, transverse, sectional, view showing the pivotal connection between the weighing and dumping receptacle and the supplemental weighing beam.
Fig. 11 is an enlarged detail transverse sectional view showing the supplemental scale bar, the adjustable poise thereon, and part of the tripping device.
Figure 12:
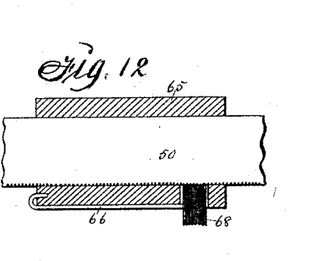
Fig. 12 is an enlarged detail longitudinal sectional view showing the construction of the poise, and its manner of connection with the scale beam.
Figure 13:
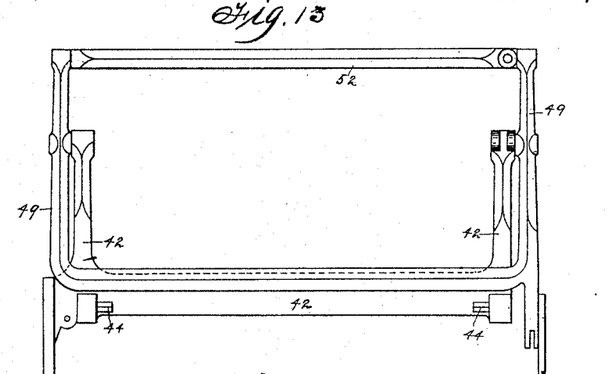
Fig. 13 is an enlarged detail plan view showing the construction of the main and supplemental weighing beams and their position relative to each other.
Figure 14:
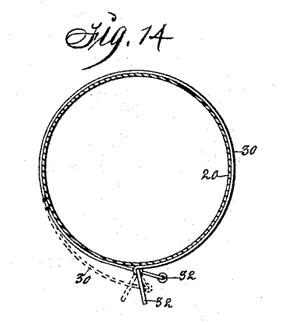
Fig. 14 is an enlarged detail horizontal sectional view through the discharge pipe of the containing hopper, to illustrate the connection and operation of the guide, relatively thereto.
Figure 15:
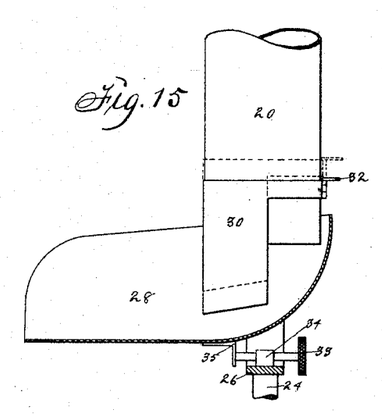
Fig. 15 is an enlarged detail view showing one of the discharge pipes and a guide connected therewith and one of the vibrating discharge spouts shown in longitudinal section, together with the mechanism for adjusting the incline of the same.
Figure 16:
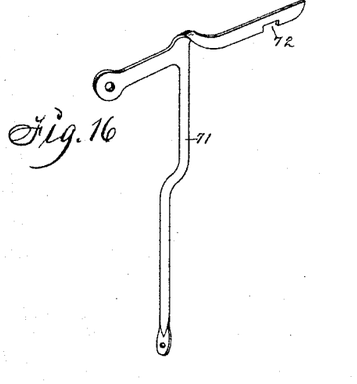
Fig. 16 is an enlarged detail perspective view of the trigger of the tripping mechanism.

I shall now proceed with a description of the weighing and dumping mechanism. The reference symbol 42 designates the main weighing beam which has a part extending parallel with the shaft 15, two arms projecting forwardly therefrom and a scale beam 43 projecting rearwardly therefrom. It is pivotally connected with the frame 11 by means of the knife-edge bearings 44 resting upon the projections 45. 46 designates a poise adjustably mounted upon the scale beam 43 and provided with the set screw 47 whereby it may be secured in place. In the forward ends of the weighing beam 42 are formed the cavities 48 adapted to admit knife edged bearings. 49 designates the auxiliary weighing beam having a part extending parallel with the shaft 15 and two arms extended forwardly and a scale beam 50 extended rearwardly therefrom. This weighing beam is fulcrumed to the weighing beam 42 by means of the inward projecting knife edge bearings 51 entering the cavities 48. 52 designates a frame for supporting the weighing and dumping receptacle and having a pivoted connection with the outer ends of the weighing beam 49 by means of the knife edge bearings 53 entering the cavities 54 formed in the said frame. This frame is normally held in an approximately vertical position by means of the arm 55 projecting downwardly therefrom. 56 is a like arm projecting downwardly from one of the outer ends of the weighing beam 42 to which it is pivotally attached. 57 is a link pivoted in the rear of a frame 58 and extended horizontally forwardly in the said frame 58 and pivoted to the lower end of the arm 56. 59 is a connecting link having a pivotal connection with the lower ends of the arms 55 and 56. This arrangement it will be obvious will maintain the frame 52 in a vertical position and at the same time allow all necessary flexion and not interfere with the weighing mechanism. The reference number 60 designates the weighing and dumping receptacle, which is pivoted below its gravity center at 61 between the uprights of the frame 52 in such a manner as to be capable of being dumped either forwardly or backwardly. 62 is a partition dividing the said receptacle into two equal parts. 63 designates a discharge spout fixed to the frame 11 and of a great enough capacity to receive the contents of the dumping receptacle 60 when dumped in either direction and discharge it through the small chute 64 at its lower end. 65 designates the sliding poise on the scale bar 50, it is made to be quickly and accurately adjustable thereon by having the spring rod 66 fixed in one of its ends and extended longitudinally thereof in a groove 67 formed in its under side; revolubly mounted upon its free end is an externally screw-threaded collar 68 adapted to engage a mating screw thread formed on the under edge of the scale bar. By this arrangement the poise may be placed in proximity to the desired points by drawing the screw threaded collar 68 downwardly out of engagement with the scale bar and then sliding it along the scale bar and a more delicate adjustment may be effected by a rotation of the said screw threaded collar when in engagement with the scale bar. 69 designates a set screw in the side of the poise 65, to engage the scale bar, to secure it in position. 70 designates guides secured to the frame 11 and having openings to admit the rear ends of the scale bars to thereby limit their movement. By this arrangement of two separate scale beams the one resting upon the other the following results are accomplished:—After a certain predetermined amount of weight has been deposited in the weighing and dumping receptacle which amount comprises the major portion of the amount to be put in each package,—the poise connected with the main weighing beam will be overbalanced and partially lowered. This movement will set in motion the mechanism which cuts off the discharge from the main dumping and discharge spout as elsewhere described and allows only a small quantity to flow into the weighing and dumping receptacle, through the auxiliary discharge spout. After the predetermined amount of weight is deposited within the weighing and dumping receptacle it is again lowered by the weight on the auxiliary weighing beam being overbalanced. This movement actuates trip mechanism which releases the weighing and dumping receptacle as elsewhere stated. Thus it will be seen that a rapid discharge is made into the weighing and dumping receptacle while the major portion of the weight is being delivered thereinto, and about the time that it is ready to dump the rapid discharge is cut off and a fine flow continued until the necessary amount required to overbalance the auxiliary weighing beam has been placed in the weighing and dumping receptacle. 71 designates the trigger of the tripping device. It is in the form of a bell crank lever and is fulcrumed to the top of one of the uprights of the frame 52. In its horizontally extending arm is formed an elongated slot 72 which is adapted to engage, by gravity, the pins 73, 73, which project from the side of the weighing receptacle 60. These pins 73, 73 are so located on the weighing receptacle 60 that they will enter the slot 72 when the weighing receptacle is dumped in either direction and resting upon the cushioned supporting bars 74, the said slots 72 being large enough to allow the weighing receptacle to be elevated to clear the bars 74 without releasing it. 75 designates a lever fulcrumed to the scale beam 50 in the rear of its pivotal point, and extended upwardly into the part 13 into proximity to a wheel 76 fixed to the axle 15. This wheel is adapted to engage the said lever either by having an annular groove formed in its periphery to admit the lever, or toothed as shown in dotted lines in Fig. 8, to engage the lever. 77 is a connecting rod pivoted to the lever 75 and to the lower end of the trigger 71 so that a forward movement of the lever 75 will elevate the upper arm of the trigger 71 and thereby release the weighing receptacle. This is automatically accomplished as follows. When the weighing receptacle contains sufficient weight to overbalance the poises 65 and 46, and said poises are elevated thereby, the lever 75 will be elevated into engagement with the wheel 76, which is being rotated forwardly. This lever must be moved either forwardly or rearwardly to escape the wheel 76 and as the said wheel is being rotated forwardly it will obviously throw the lever forwardly and thereby elevate the horizontal arm of the trigger, which releases the weighing receptacle, while the weight contained therein overbalances it and is dumped into the discharge spout 63. The numeral 78 designates a dumping scoop fixed to the rock shaft 79, which is extended through a bearing 80 formed on or fixed to the forward side of the frame 11. 81 designates a cushioned fork adapted to restrict the movements of the scoop 78. This fork is fixed to the said bearing 80 and its ends are so disposed as to allow the scoop to be dumped and to support it when in an approximately horizontal position. 82 designates a bell crank lever fixed to the rear end of the rock shaft 79. 83 is a coil spring attached to the top of said bell crank lever, and normally exerting its force in pulling downwardly thereupon, to bring the scoop into engagement with either one or the other end of the fork 81. 84 designates a metal fork adapted to admit the shaft 15 between its ends. This fork is pivoted to the bell crank lever 82 in such a manner as to allow a slight flexion relative thereto in either direction. 85 designates ratchet teeth formed on the inner faces of the fork and extended in opposite directions so that either of them, when brought into contact with the shaft 15, will be engaged by the ratchet teeth 86 and either lower or elevate the said fork. 87 is an arm fixed to the scale beam of the main weighing beam extended upwardly therefrom, bent at right angles forwardly and connected with the upper end portion of the fork 84, in such a manner that when the scale bar is elevated by reason of a preponderance of weight in the weighing and dumping receptacle, the fork will be thrown forward and the ratchet teeth on the rear side of the fork will be engaged by the ratchet teeth on the shaft and the fork lowered, which will place the scoop in an approximately horizontal position. But when the weighing and dumping receptacle is dumped, the scale bar will be lowered and the opposite ratchet teeth brought into proximity to the shaft where they will be engaged by the ratchet teeth formed thereon, and elevated, thereby placing the scoop in a position for directing the flow of the main vibrating discharge spout into the weighing and dumping receptacle. Assuming that the normal position of this scoop 78 is inclined, to discharge into the main weighing and dumping receptacle, it will be obvious that the major part of the substance contained in the hopper will pass over said scoop into the main weighing and dumping receptacle, this latter when containing a sufficient amount of weight will elevate the scale beam 43 as stated which as clearly shown in Fig. 4 will cause the arm 87 to move the fork 84 forwardly in such a manner as to bring the ratchet teeth 85 on one part of the fork into engagement with the teeth on the shaft 15 which is being rotated by some extraneous power, so that the said fork will be lowered by the shaft. A close examination of Fig. 5 will show that this will cause the aforesaid scoop to occupy an approximately horizontal position, and prevent the flow into the main weighing and dumping receptacle, in order that the auxiliary discharge spout which has a more minute discharge may complete the amount requisite for dumping the weighing and dumping receptacle as elsewhere described. When however, the main weighing and dumping receptacle has dumped the scale beam 43 will be automatically lowered, which will cause the arm 87 to move the fork 84 rearwardly and bring the opposite ratchet teeth into engagement with the teeth on the shaft 15, and once more bring the scoop to an inclined position.

The reference numeral 88 designates a hinged door on the rear of the enlarged portion 13 to provide access to the interior thereof.

Having thus described the construction, operation and function of each part in its turn I shall now proceed to briefly describe the operation of the machine as a whole. The poises are first adjusted on their scale beam so that the machine will dump at any predetermined weight. The hopper is then filled and a rotary motion imparted to the main shaft, which will vibrate both of the discharge spouts. As the weighing and dumping receptacle is in an elevated position the dumping scoop will direct the discharge from the main vibrating discharge spout into the weighing and dumping receptacle until the latter becomes heavy enough to elevate the poise 46 which operation will throw the fork into engagement with the rear of the scoop into a position in which it receives the discharge from the main vibrating discharge spout, while this scoop is being filled the small vibrating discharge spout continues to discharge into the weighing and dumping receptacle until sufficient weight is gathered therein to overbalance the poise 65, when the lever 75 is brought into engagement with the wheel 76 and the trip device released to allow the weighing and dumping receptacle to dump by gravity, as the small vibrating discharge spout continues discharging into the weighing and dumping receptacle, the weight of such discharge soon causes the weighing and dumping receptacle to be elevated above the cushioned supporting bars 74 as much as is allowed by the elongated slot 72 and pins 73, so as not to affect the accuracy of the weighing by contact with extraneous objects. For instance, if it is desirable to adjust the machine to weigh the material by pounds, the poise on the main weighing beam is set to be overbalanced by about fifteen ounces of extra weight in the main weighing and dumping receptacle, and the poise on the auxiliary weighing beam set to be overbalanced by sixteen ounces of extra weight in the main weighing and dumping receptacle, approximately the same amount of time is consumed in the flow of the one ounce into the weighing and dumping receptacle as is required for the flow of the fifteen ounces from the scoop and by this arrangement a slow discharge is made into the weighing receptacle at and before the time it is dumped to produce accuracy in weighing and the more rapid discharge of the scoop 78 prevents the loss of time in the operation of the machine.

Having thus described the machine, what I claim as my invention, and desire to secure by Letters Patent, is—

1. In an automatic weighing machine the combination of the following elements, a suitable supporting base, a frame adapted to contain and support the operative mechanism, a containing hopper mounted in the top of the said frame, two discharge pipes leading from the said hopper, a dumping scoop adapted to receive the discharge from one of the said discharge pipes and a weighing and dumping receptacle adapted to receive the discharge from the said scoop and the remaining discharge spout, substantially for the purposes stated.

2. In an automatic weighing machine, the combination of the following elements, a containing hopper mounted in the top of the machine frame, a pipe leading therefrom, a vibrating discharge spout at the bottom of the said pipe in communication therewith, a metal band encircling the said pipe and having its forward edge project downwardly into the said vibrating spout, to control the flow from the pipe to the spout, and the means shown and described for connecting it therewith.

3. In an automatic weighing machine the combination of the following elements, a rock shaft having a forked end, a discharge spout pivoted in said forked end, an angle piece fixed to the bottom of the discharge spout and extending downwardly therefrom, a lug formed on or fixed to the top of said rock shaft a set screw extended through said lug longitudinally of the spout and adapted to engage the said angle piece so that the incline of the spout may be adjusted by a manipulation of said set screw.

4. In an automatic weighing machine the combination of a containing hopper, a pipe leading therefrom, the vibrating spout as set forth, the guide for regulating the flow from the pipe to the spout as set forth, and the means for adjusting the incline of the spout, substantially as shown and described.

5. In an automatic weighing machine the combination of a rock shaft extended vertically in the machine frame, a discharge spout mounted at its upper end in position to receive the flow from a containing hopper, a wheel having an irregular periphery arranged to be rotated adjacent to the said rock shaft, an arm fixed to said rock shaft and yielding pressure devices normally holding said arm in engagement with the said wheel for the purposes stated.

6. In an automatic weighing machine the combination of a rock shaft extended vertically in the machine frame, a discharge spout mounted in its upper end in position to receive the flow from a containing hopper, a wave wheel having regular concave surfaces formed on its periphery an arm fixed to the said rock shaft, and yielding pressure devices normally holding said arm in engagement with the said wheel, for the purposes stated.

7. In an automatic weighing machine, the following elements in combination:—a containing hopper, the pipes having the adjustable guides thereon, leading from said hopper, as set forth, the vibrating discharge spouts mounted on the vertical rock shafts and having the means for providing for their vertical adjustment as shown and described, a wheel having an irregular periphery arranged to rotate adjacent to said rock shaft, and an arm fixed to each rock shaft and yielding pressure devices normally holding the said arms in engagement with said wheel.

8. In an automatic weighing machine the combination of the following elements:—a containing hopper, the pipes having the adjustable guides thereon, leading from said hopper, as set forth, the vibrating discharge spouts mounted on the vertical rockshafts and having the means for adjusting their incline as shown and described, a wave wheel, having regular concave surfaces on its periphery rotatably mounted between the said rock shafts, an arm fixed to each rock-shaft and extended into proximity to the said wave wheel in the same horizontal plane, and yielding pressure devices applied to the outer one of the said arms to cause the arms to follow the contour of the said wheel and vibrate the discharge spouts substantially as set forth.

9. In an automatic weighing machine the following elements in combination:—a containing hopper, the pipes having the adjustable guides thereon, leading from the said hopper, as set forth, the vibrating discharge spouts mounted on the vertical rock shafts and having the means for adjusting their incline as shown and described, a wave wheel mounted between the said rock shafts, an arm fixed to each rock shaft and extended into proximity to the said wave wheel, the one outside of the other, yielding pressure devices connected with the inner arm to normally hold it out of engagement with the wave wheel, a lever fulcrumed to the frame, a spring, attached to the upper end of the lever and to the outer one of the aforesaid arms and means for holding the lever in a position to bring the said arms into engagement with the wave wheel or to allow the arms to be disengaged from the wave wheel substantially as set forth.

10. In an automatic weighing machine the following elements in combination, a main weighing beam having a scale bar and poise constructed and arranged substantially as set forth, an auxiliary weighing beam mounted in the outer end of said main weighing beam and provided with a suitable scale bar and poise, a dumping receptacle mounted in the outer end of the auxiliary weighing beam substantially as set forth, two spouts normally discharging into the said dumping receptacle and means whereby one of them is cut off upon the overbalancing of the main weighing receptacle for the purposes stated.

11. In an automatic weighing machine the following elements in combination:—a main weighing beam, an auxiliary weighing beam mounted on the outer end of said main scale beam, a weighing and dumping receptacle mounted on the outer end of the auxiliary weighing beam, a dumping scoop normally in position for discharging into the said weighing and dumping receptacle, means whereby the dumping scoop is automatically placed in a position for containing substances placed therein, when the main weighing beam is overbalanced, and means whereby the weighing and dumping receptacle is automatically dumped when the auxiliary weighing beam is overbalanced, substantially in the manner set forth.

12. In an automatic weighing machine an automatic dumping scoop comprising a rock shaft mounted in the machine frame, a suitable scoop fixed to its outer end, a bell crank lever secured to its inner end, a forked rod pivotally attached to the said bell crank lever and having ratchet teeth formed on its inner surfaces as set forth, a rotating shaft having ratchet teeth formed therein means for automatically bringing the ratchet teeth on the fork into engagement with the ratchet teeth on the shaft for the purposes stated, and means for restricting the movement of the scoop substantially as shown and described.

13. In an automatic weighing machine an automatic dumping scoop, comprising the following elements, a rock shaft having a scoop fixed to its one end and a bell crank lever fixed to the other, the fork having the ratchet teeth formed thereon as set forth, pivotally connected with the said bell crank lever a spring connected with the other end of said lever and normally expending its force in a downward direction thereupon, a rotatable shaft having ratchet teeth formed thereon as set forth adapted to engage the ratchet teeth formed on the said fork a rod connected with the fork to bring either end thereof into engagement with the said shaft, means for automatically operating the said rod and a cushioned fork to restrict the movement of the scoop all substantially in the manner set forth and for the purposes stated.

14. In an automatic weighing machine the following elements in combination;—two discharge spouts leading from a containing hopper a dumping scoop adapted to receive the discharge from one of the said spouts, a main weighing beam, an auxiliary weighing beam mounted thereon, a weighing and dumping receptacle mounted upon the said auxiliary weighing beam, means whereby the said dumping scoop may be automatically placed in a position to receive the discharge when the main weighing beam is overbalanced, means for automatically dumping the weighing and dumping receptacle when the auxiliary weighing beam is overbalanced, and means for automatically dumping the aforesaid dump scoop after the weighing and dumping receptacle has been dumped and the receptacle is in position for receiving substances from the said dumping scoop.

15. In an automatic weighing machine the following elements in combination;—two discharge spouts leading from a containing hopper an automatic dumping scoop constructed substantially as set forth and adapted to receive the discharge from one of the said discharge spouts, a main and auxiliary weighing beam constructed and arranged substantially as set forth, a weighing and dumping receptacle mounted on the auxiliary weighing beam in the manner set forth, and means for dumping the said receptacle when its weight overbalances the auxiliary weighing beam.

16. In an automatic weighing machine the following elements in combination, a weighing and dumping receptacle having two compartments formed by a longitudinal partition, and mounted upon a weighing beam in such a manner as to be capable of being dumped in either direction, means for limiting the movement of the weighing and dumping receptacle, two pins projecting outwardly from one side of the receptacle, a trigger having a horizontal arm provided with a notch adapted to admit either of the said pins when the receptacle is dumped in the proper direction, a lever pivoted to the aforesaid weighing beam in the rear of the pivotal point thereof, a connecting rod attached to the aforesaid trigger and the said lever and means for automatically inclining the said lever forward when it is elevated by reason of the weighing receptacle being lowered to thereby release the weighing and dumping receptacle.

17. In an automatic weighing machine the following elements in combination, a weighing and dumping receptacle having two compartments formed by a longitudinal partition, and mounted upon a weighing beam, substantially in the manner set forth, the means shown and described for limiting the movement of the said receptacle, the pins projecting therefrom for the purposes stated, the trigger having the elongated slot in its horizontal arm as set forth, a rotatable wheel having an annular groove in its periphery for the purposes stated, and the lever and connecting link to actuate the trigger all arranged and combined substantially in the manner set forth for the purposes stated.

18. The combination in an automatic weighing machine of the following elements, to wit: the main and auxiliary weighing beams having the weighing and dumping receptale mounted thereon, as set forth, the auxiliary dumping scoop arranged to be operated by the main weighing beam substantially as set forth, and the automatic trip device arranged to be operated by the auxiliary weighing beam substantially as set forth, and means for providing a continuous flow into the auxiliary dumping scoop and into the weighing and dumping receptacle.

19. In an automatic weighing and packing machine, the combination of the following elements;—a suitable base and supporting frame, a containing hopper supported by said frame, a main weighing beam and an auxiliary weighing beam mounted thereon, a weighing and dumping receptacle having two longitudinally extending compartments and mounted upon the auxiliary weighing beam in such a manner as to be capable of being dumped in either direction, an auxiliary dumping scoop arranged to be automatically operated by the main weighing beam, and to discharge into the weighing and dumping receptacle until the main weighing beam is overbalanced, two discharge spouts of different capacities leading from the aforesaid hopper, the larger one discharging into the auxiliary dumping scoop and the smaller one into the weighing and dumping receptacle, means for vibrating the said discharge spouts mechanism actuated by the auxiliary weighing beam for dumping the weighing and dumping receptacle and a collecting and discharge spout adapted to direct the weighed substances into packages, and means for operating the machine.

20. In an automatic weighing and packing machine the combination of the following elements: the base frame and containing hopper substantially as set forth, the main and auxiliary weighing beams having the weighing and dumping receptacle mounted therein, as set forth, the auxiliary dumping scoop adapted to be actuated by the main weighing beam substantially as set forth the discharge spouts leading from the hopper and having the mechanism for vibrating them as set forth, the trip-device to release the weighing and dumping receptacle actuated by the auxiliary weighing beam, as set forth, the collected and discharge spout to direct the weighed substances into packages and means for operating the machine, all arranged and combined substantially in the manner set forth for the purposes stated.

JOHN A. OSTENBERG.

Witnesses:
J. RALPH ORWIG,
THOMAS G. ORWIG.